(12) United States Patent
White (10) Patent No.: US 6,310,985 B1
(45) Date of Patent: Oct. 30, 2001

(54) MEASURING ANGULAR ROTATION OF AN OBJECT

(75) Inventor: Raymond G. White, San Jose, CA (US)

(73) Assignee: Electroglas, Inc., San Jose, CA (US)

( * ) Notice: Subject to any disclaimer, the term of this patent is extended or adjusted under 35 U.S.C. 154(b) by 0 days.

(21) Appl. No.: 09/126,019

(22) Filed: Jul. 29, 1998

(51) Int. Cl.$^7$ ........................................... G06K 9/36
(52) U.S. Cl. ........................ 382/289; 356/138; 348/126
(58) Field of Search ........................... 382/289, 296, 382/297, 290, 199, 266, 263, 151, 174, 287, 141; 348/86, 125, 126, 128, 135, 136; 356/138

(56) References Cited

U.S. PATENT DOCUMENTS

| | | | |
|---|---|---|---|
| 3,732,366 | * 5/1973 | Bolie | 178/6.8 |
| 4,179,685 | * 12/1979 | O'Maley | 340/146.3 |
| 4,225,929 | * 9/1980 | Ikeda | 364/521 |
| 4,736,437 | * 4/1988 | Sacks et al. | 382/34 |
| 5,699,282 | * 12/1997 | Allen et al. | 364/571.01 |
| 5,822,389 | * 10/1998 | Uzawa et al. | 378/34 |
| 5,834,334 | * 11/1998 | Leody | 438/107 |
| 6,011,536 | * 1/2000 | Hertzmann et al. | 345/112 |
| 6,048,750 | * 4/2000 | Hembree | 428/107 |
| 6,061,467 | * 5/2000 | Michael | 382/151 |

* cited by examiner

Primary Examiner—Joseph Mancuso
Assistant Examiner—Yosef Kassa
(74) Attorney, Agent, or Firm—Blakely, Sokoloff, Taylor & Zafman (57) ABSTRACT

A system is disclosed for determining the rotational orientation of an object. An image of the object is digitally captured. The digital image is filtered through an edge detection operation to enhance the edge information contained in the image. The filtered image is rotated through a series of incremental angles to produce a series of rotated images. Each rotated image is projected onto an x-axis and y-axis defined by pixel grid axes defined by the original image. The projection of the rotated images produces projected pixel counts formed by the summation of pixel value differences of the x-axis and y-axis on the projected image. For each rotated image, a score corresponding to the sum of the difference of gray-scale values for adjacent projected pixels is computed. The scores for the projections of each rotated image are plotted on a score-angle graph. A curve which includes the highest score and the neighboring next highest scores is interpolated to determine the peak score. The peak score corresponds to the scene angle of the object relative to the x-axis and y-axis defined by the original image.

16 Claims, 7 Drawing Sheets

| -1 | 0 | 1 |
|----|---|---|
| -2 | 0 | 2 |
| -1 | 0 | 1 |

HORIZONTAL SOBEL OPERATOR

| 1 | 2 | 1 |
|---|---|---|
| 0 | 0 | 0 |
| -1 | -2 | -1 |

VERTICAL SOBEL OPERATOR

MEASURING ANGULAR ROTATION OF AN OBJECT

FIELD OF THE INVENTION

The present invention relates generally to semiconductor manufacturing processes, and more specifically to determining the rotational orientation of an object for alignment of a test probe assembly.

BACKGROUND OF THE INVENTION

Integrated circuits are typically manufactured on a semiconductor substrate, such as a silicon wafer. The silicon wafer is a thin circular plate of silicon of 150 or 200 millimeters in diameter and approximately 25 mils thick. A single wafer has numerous integrated circuit devices that are imprinted on the wafer and comprise a lattice of devices. Each device consists of numerous layers of circuitry and a collection of bonding pads. The bonding pads are typically small pads of three mils square which serve as connections to the device pin leads.

Prior to the packaging of integrated circuit devices into carriers, the devices are often tested to avoid packaging bad devices. The testing process involves connecting a probe card to a tester. The probe card has a collection of electrical contacts or pins that stand in for the normal pins and wire leads of a packaged device. The wafer is then positioned so that the pins on the probe card make contact with a given device's bonding pads and the tester runs a battery of electrical tests on the device. A special machine, called a wafer prober, is used to position each device on the wafer with respect to the probe card. Each device on a wafer is tested in turn as a probe is driven by a stepper motor. High accuracy is required, because the bonding pads are small. If a probe card pin makes contact outside the pad area the device must be repositioned, slowing the testing process, and requiring operator intervention. Moreover, incorrect positioning can cause damage to the device since the probe card pins may break through the passivation layer of the device.

The primary purpose of wafer probing is to accurately position the wafer so that the device's bonding pads make sufficient electrical contact with a probe card's probe tips. Proper positioning requires that the prober accurately align a wafer to a specified axis relative to the motion axis of the prober motor. Typical methods of positioning a wafer in a tester involve taking an image of the die on a wafer using a video camera and determining a feature on the wafer which can be used to align an axis of the wafer with the motion axis of the probe motor.

Present known methods of aligning a wafer on a chuck often exhibit unreliable performance. Problems with these known methods may involve harsh lighting conditions which interfere with the operation of the camera or the presence of fine details in the image which produce incorrect reference points in low resolution vision processors.

It is therefore an intended advantage of the present invention to provide an accurate method of determining the rotation of an object in a vision processor.

It is a further intended advantage of the present invention to provide an angle correction for coarse alignment of semiconductor wafers in a probe tester through a method and apparatus which is insensitive to noise and environmental conditions.

SUMMARY OF THE INVENTION

A method of determining the rotation of an object in a vision processing system is disclosed. An image of the object is digitally captured. The digital image is filtered through an edge detection operation to enhance the edge information contained in the image. The filtered image is rotated through a series of incremental angles to produce a series of rotated images. Each rotated image is projected onto an x-axis and y-axis defined by pixel grid axes defined by the original image. The projection of the rotated images produces projected pixel counts formed by the summation of pixel value differences of the x-axis and y-axis on the projected image. For each rotated image, a score is computed. The score corresponds to the sum of the difference of gray-scale values for adjacent projected pixels. The scores for the projections of each rotated image are plotted on a graph of score versus angle. A curve is defined which includes the highest score and the neighboring next highest scores. The curve is interpolated to determine the peak score. The peak score corresponds to the scene angle of the object relative to the x-axis and y-axis defined by the original image.

In one embodiment of the present invention, the scene angle is used in a wafer probing system to provide angle correction for coarsely aligning an semiconductor wafer relative to a test probe assembly.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A system is described for determining the rotational orientation of an object by determining the dominant scene angle of a digital image of the object. Various embodiments of the present invention may be implemented in discrete hardware components or, alternatively, in programmed processing units such as digital signal processors using software which is compiled, linked and then loaded from disk-based storage for execution during run-time. Various programs containing the methods employed in these embodiments may also reside in firmware or other similar nonvolatile storage means.

Methods of the present invention may employ one or more mathematical algorithms. An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be noted, however, that all of these and similar terms are to be associated with the appropriate physical quantities and serve as convenient labels applied to these quantities.

Figure 1:
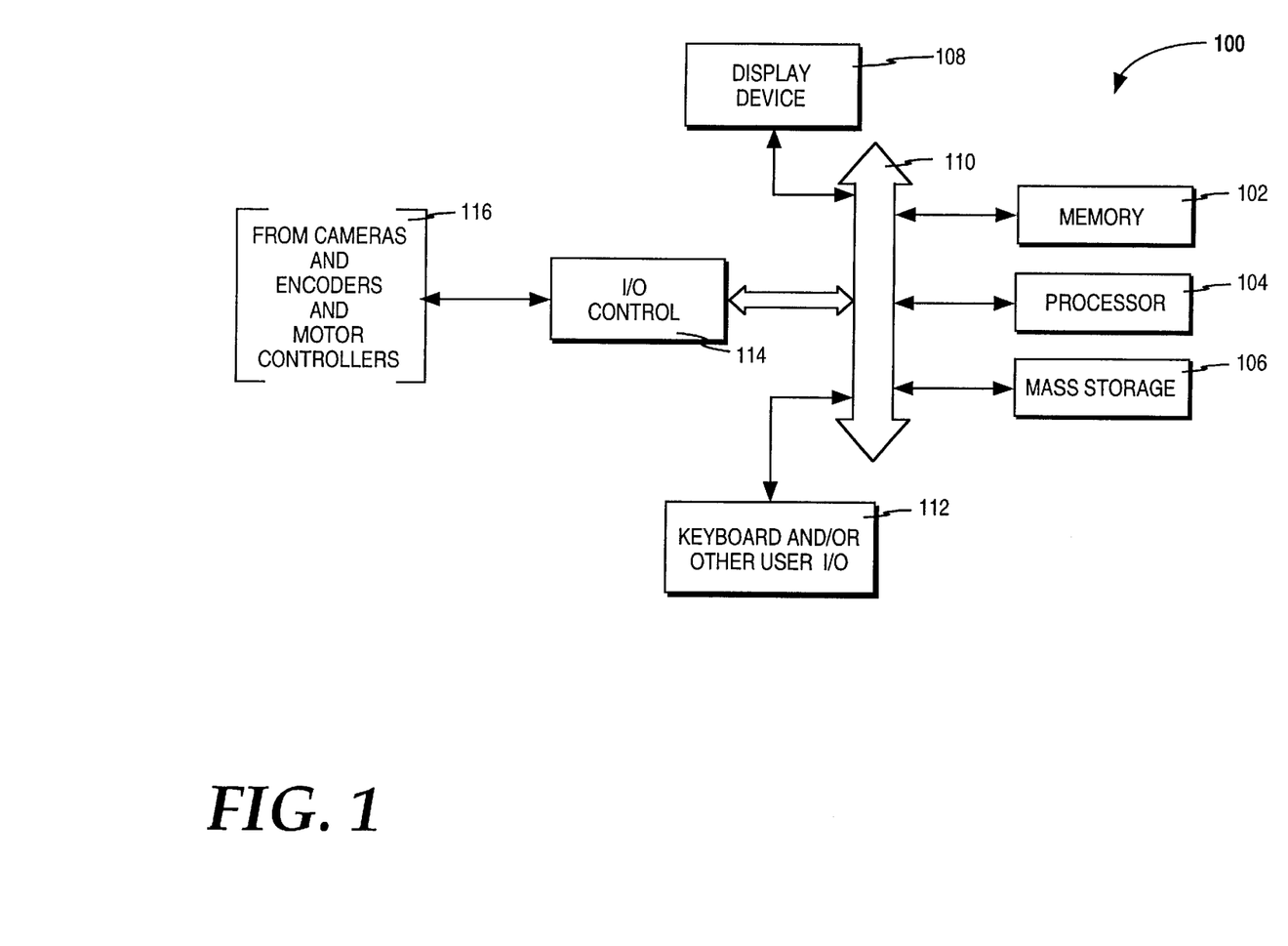
FIG. 1 is a block diagram of a digital processing system which may be coupled to a wafer probe system, and which may be used to implement embodiments of the present invention.

FIG. 1 is a block diagram illustrating a digital processing system which may be used in conjunction with an embodiment of the present invention. Digital processing system 100 includes a processor 104 (which may be a general purpose microprocessor), a memory 102, and a mass storage device 106, such as a hard disk or optical disk. In one embodiment of the present invention, the computer instructions which implement methods of the present invention comprise software which is executed by processor 104 and stored in mass storage 106. User input to processing system 100 is provided through input/output unit 112, which may be a keyboard or other input or cursor control device, such as a mouse or joystick. Graphical output from processing system 100 is provided through display device 108. The components of system 100 are typically coupled to each other through at least one bus, such as central bus 110.

In one embodiment of the present invention, processing system 100 is used as a controller for a semiconductor wafer probing device which performs electrical tests on integrated circuits (die) within a wafer. The probing device includes devices such as motors for the movement of the wafer and probe heads, and cameras for the capture of graphical images of the die in a wafer. In one embodiment of the present invention, processing system includes input/output (I/O) control unit 114. I/O controller 114 receives inputs from cameras, position/motion encoders and motor controllers, and provides these inputs to bus 110 for processing by processor 104. I/O controller also provides outputs to external devices such as cameras and motor controllers. These input and output signals allow processing system 100 to control an entire probing system using test software stored in mass storage 106 and/or memory 102.

Figure 2:
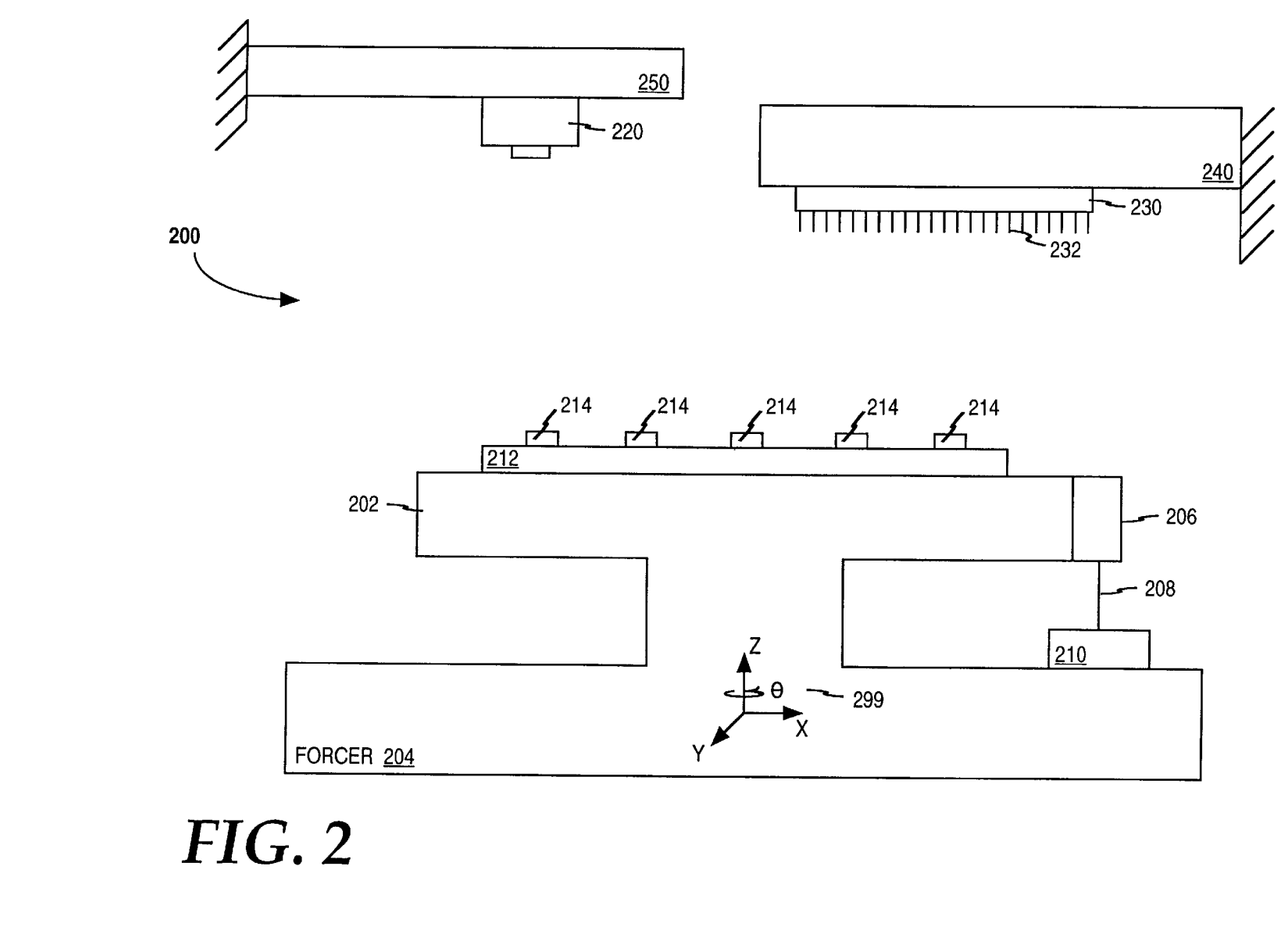
FIG. 2 is a block diagram of a probe device for semiconductor testing which may be used in an embodiment of the present invention.

FIG. 2 illustrates a probe sensor which may be used with processing system 100 according to one embodiment of the present invention. Probe sensor 200 aligns the probe contacts to the pads of a die being tested. Probe sensor 200 includes a wafer chuck 202 which is moveably coupled to a forcer 204 in a manner which allows wafer chuck 202 to be moved in several directions, as defined by the X, Y reference axes 299, and angle theta about the Z axis. The wafer chuck 202 accepts the attachment of a wafer 212. Wafer 212 includes pads 214 which provide contact areas for the prober.

Prober 200 also includes a prober chuck 240 which accepts a probe card 230. Probe card 230 includes a number of conducting contact electrodes 232. These contact electrodes 232 make contact with the pads 214 of wafer 212 when the probe card 230 and wafer 212 are properly aligned by prober 200. In one embodiment of the present invention, the alignment is accomplished using a vision subsystem. The vision subsystem according to one embodiment uses two cameras, a wafer alignment camera 220 and a sensor camera. In a typical construction, the sensor camera comprises a front objective lens 206 connected to a camera housing 210 through a connection 208. The front objective lens 206 is coupled to wafer chuck 202, and moves with the wafer chuck. The sensor camera functions to image the pins 232 of probe card 230 and use the information to perform automatic probe to pad alignment. The wafer alignment camera 220 is mounted on a camera support 250 and may contain both coaxial and oblique illumination sources. Wafer alignment camera 220 is configured to view a wafer 212 on the wafer chuck 202. While the system shown in FIG. 2 probes a wafer horizontally, it will be appreciated that the various aspects of the present invention may be used with a vertical prober system in which the flat surface of the wafer is rotated 90° from the position shown in FIG. 2.

As stated above, the semiconductor wafer in prober 200 can rotate relative to the chuck by an angle defined by the X and Y axes. For proper probing of die on a wafer it is imperative that the wafer be aligned on the wafer chuck. Typical methods of wafer alignment include coarsely aligning the wafer on the chuck, then finely aligning the wafer on the chuck. With reference to the prober system 200 illustrated in FIG. 2, alignment of the wafer in a vision processing system requires calibration of the wafer alignment camera to the axes to which the wafer is to be aligned. The wafer must rest on the wafer chuck with a single degree of freedom (typically, rotation about the axis normal to the wafer surface, the z-axis). The image is then digitized by a frame grabber, and its scene angle is measured using a digital processing system, such as system 100 of FIG. 1. The chuck is then rotated by the measured angle to complete the alignment process.

Figure 3:
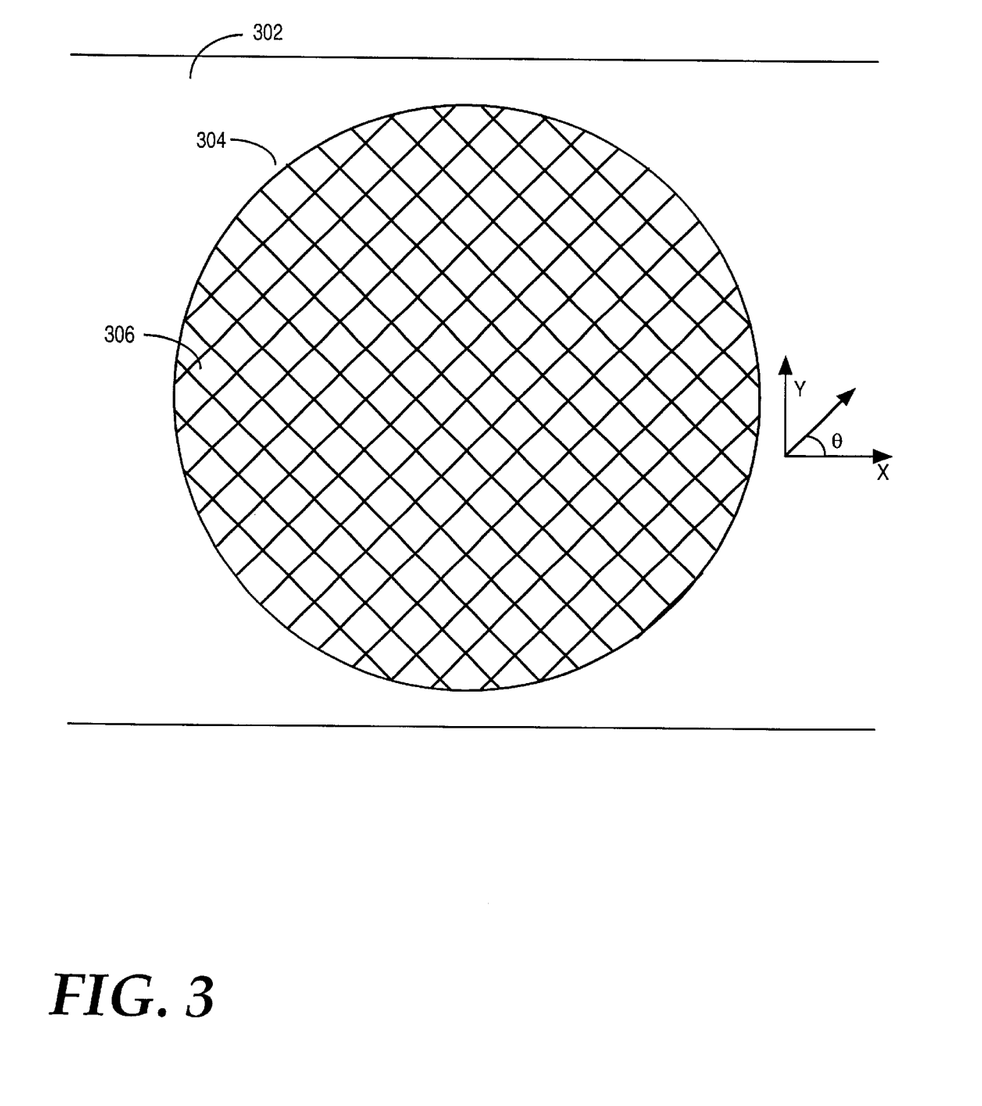
FIG. 3 illustrates a rotationally offset semiconductor wafer on the wafer chuck of a probe tester.

FIG. 3 illustrates the orientation of a semiconductor wafer on a wafer chuck in a probe system, such as probe system 200 of FIG. 2. Wafer 304 rests on wafer chuck 302. For purposes of discussion it is assumed that the axis angle of the camera corresponds to the angle axis of the chuck, so that the camera is aligned along the horizontal axis defined by the edge of the chuck 302. For proper alignment relative to the wafer chuck, the axis of the die 306 in the wafer 304 should be aligned along this axis. The relationship between the angle of the wafer and the angle of the wafer chuck is referred to as the "scene angle." FIG. 3 illustrates a wafer 304 which is rotated relative to wafer chuck 302. The horizontal axis of chuck 302 is designated the x-axis, and the vertical angle of chuck 302 is designated the y-axis. The scene angle of wafer 304 is then represented by angle theta.

Figure 4:
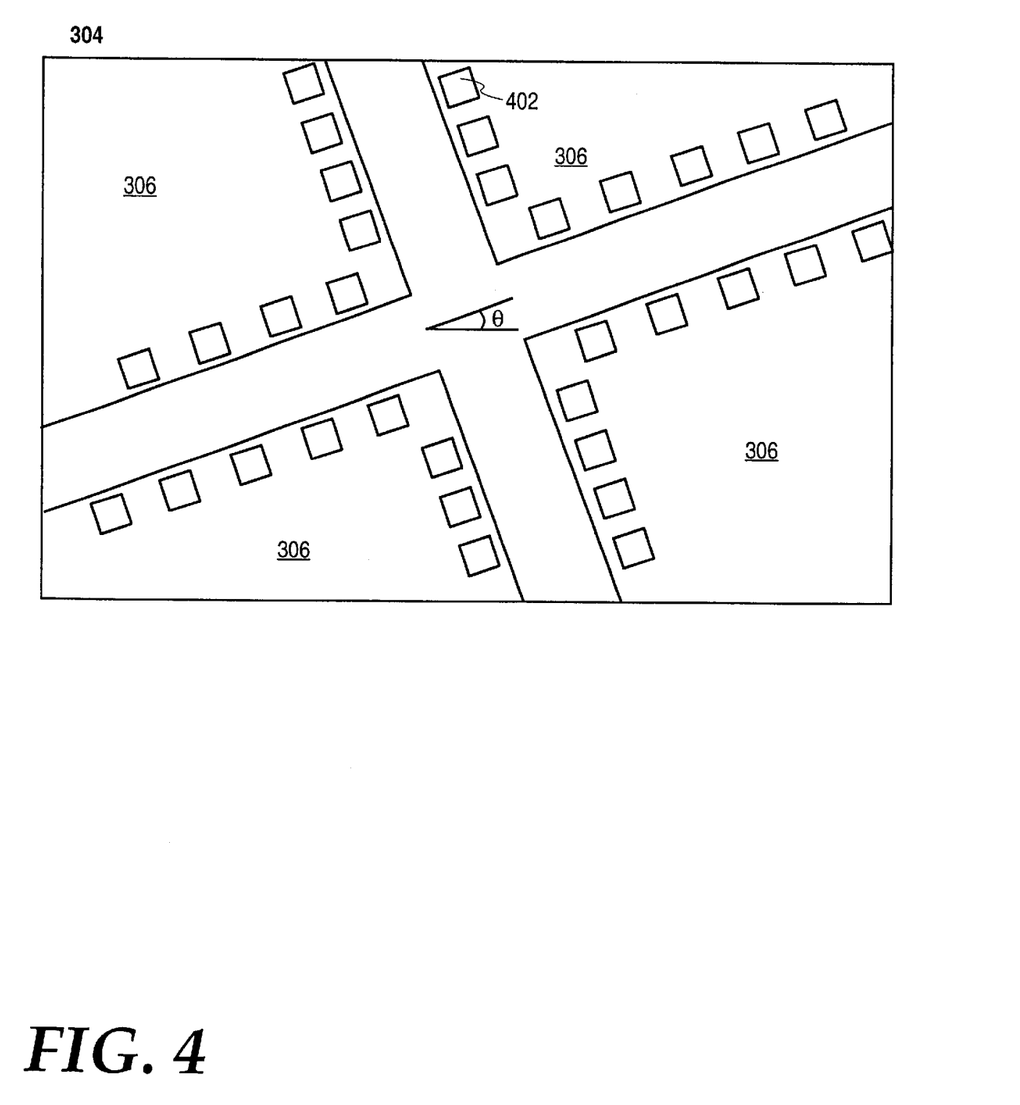
FIG. 4 illustrates the scene angle for the die on the rotationally offset semiconductor wafer of FIG. 3.

Typically, the scene angle is determined by defining a predominant linear visual feature of the object and determining the angle of rotation of the axis defined by this feature relative to a reference axis. For a semiconductor wafer, the predominant feature is typically the lines (also referred to as the "streets") between the individual die comprising the wafer. FIG. 4 is a more detailed illustration of the scene angle for wafer 304 illustrated in FIG. 3. FIG. 4 illustrates a street intersection for four die 306 within wafer 304. Each die 306 contain a number of pads 402 which are to be probed by a prober system, such as system 200 in FIG. 2. The scene angle, theta, represents the rotational offset of wafer 304 from the axes of the wafer chuck. For proper alignment of the wafer on the chuck, the scene angle should be as close as possible to the probe card angle (which is typically measured separately). Therefore, once the scene angle is determined the wafer can be rotated relative to the chuck so that the wafer and chuck are in proper alignment with one another.

Figure 7:
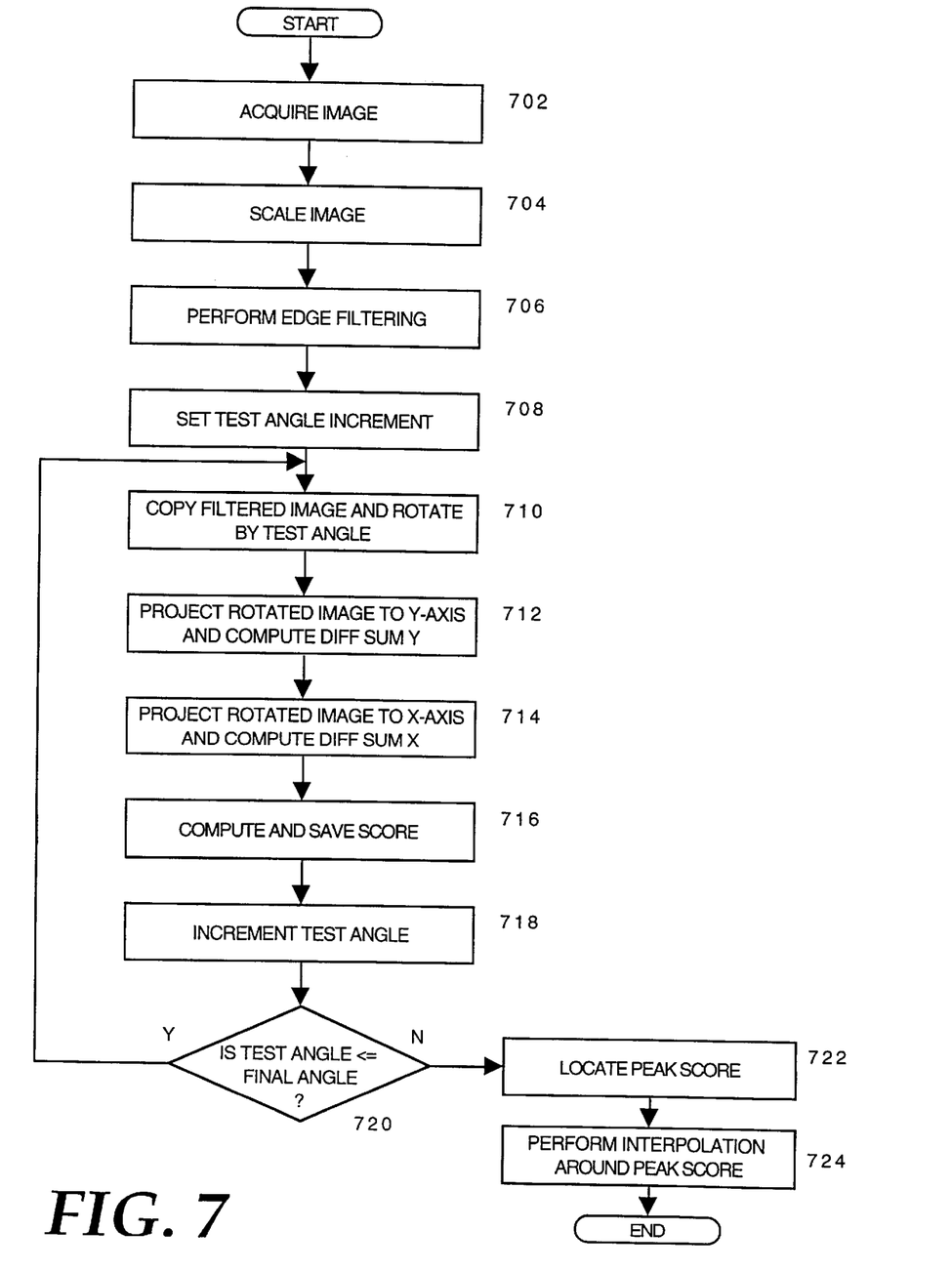
FIG. 7 is a flow chart illustrating the steps for determining the rotational orientation of an object according to a method of the present invention.

FIG. 7 illustrates the method of determining a scene angle of an object according to one embodiment of the present invention. The flowchart of FIG. 7 illustrates the sequence of events executed by the prober system 200 in determining the scene angle for a semiconductor wafer for coarse adjustment (or angle correction) of the wafer relative to the wafer chuck. The basic method for this embodiment of the present invention includes digitizing an image of the wafer, scaling the image, edge-filtering the image, incrementally rotating the image, projecting each rotated image onto orthogonal axes, scoring the projections, and interpolating the scores to determine the scene angle of the image relative to the orthogonal axes.

In step 702, the image of the object to be rotated is scanned into a digital processing system to produce a digitized image comprised of a number of pixels which represent the object. In one embodiment of the present invention, the digitized image is then scaled by taking a sub-sample of pixels to reduce the number of pixels to be processed, step 704. It should be noted that this scaling step is not required, but does serve to reduce the computation time required in subsequent steps of the method and reduces noise in the filtered image.

In step 706, the image is then filtered to enhance the edges of the image. These edges correspond to the predominant linear visual features which define the dominant axis of the object. The filtering step helps ensure that dominant axis is properly defined by the appropriate predominant feature. The filtering step, also referred to as an edge detection step, finds the pixels which define the edge of an object and removes any gray-scale gradient information to produce an image which includes only sharp black and white edge outlines. An edge pixel is generally a pixel that has a different magnitude or intensity value from one or more of its neighboring pixels.

Figure 5A:
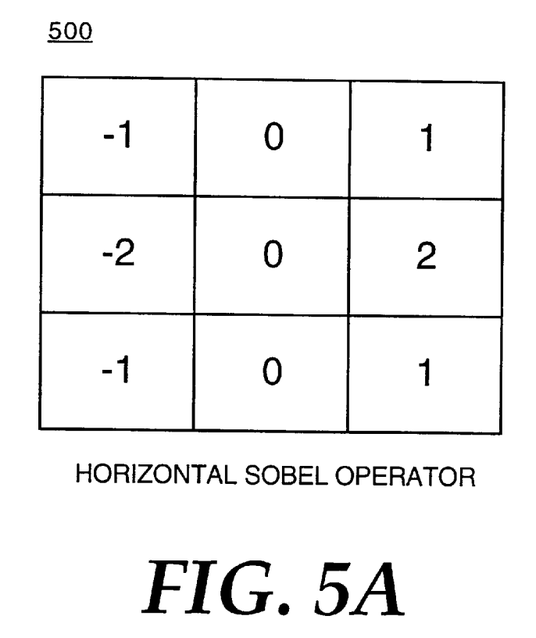
FIG. 5A illustrates a horizontal Sobel operator which may be used in a method of present invention.
Figure 5B:
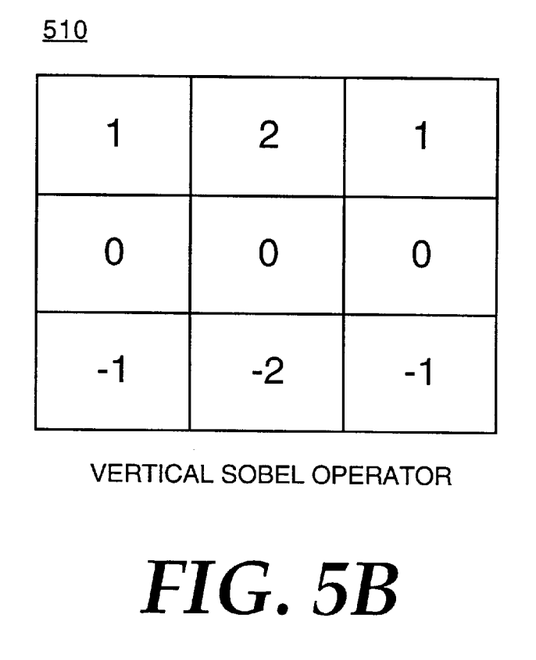
FIG. 5B illustrates a vertical Sobel operator which may be used in a method of present invention.

In one embodiment of the present invention, edge detection is performed using a Sobel filter. For this embodiment, it is assumed that the vision processing system, such as that in prober 200 is an 8-bit system. In this case each pixel is surrounded by eight other pixels, and the edge detection step finds edge pixels in the image using Sobel 3×3 neighborhood operators. A horizontal Sobel operator detects the horizontal (x) edge component for a pixel, and a vertical Sobel operator detects the vertical (y) edge component for a pixel. FIG. 5A illustrates the horizontal 3×3 Sobel operator 500, and FIG. 5B illustrates the vertical 3×3 Sobel operator 510.

During the edge detection step, Sobel operators are applied to each pixel in the image. This is performed by multiplying the gray-level value of the pixel (x, y) by the value in the center of a Sobel operator, and then multiplying each of the eight neighboring pixel gray-level values with the corresponding entries in that Sobel operator, and summing the products. In this manner, two values are produced for each pixel. One value represents the vertical edge component of the pixel, and the other value represents the horizontal edge component of the pixel. These two values are then used to compute the edge magnitude of the pixel. In general, if the result of applying at least one of the Sobel operators to a pixel yields a non-zero result, than that pixel is defined as an edge pixel. In one embodiment of the present invention, the Sobel filter values are scaled to an appropriate range of values for the image processing system. For example, in an 8-bit processing system, the Sobel gradient magnitude values produced in step 706 may be scaled to the range of 0 to 255.

After the image has been edge filtered, in step 706, a test angle increment is determined, step 708. In one embodiment of the present invention, the test angle increment is set to 0.01 radians, which roughly corresponds to half a degree (0.57°). Other embodiments may use smaller test angle increments to increase resolution and improve angular detection. Still other embodiments may use larger test angle increments to decrease the processing time and reduce memory requirements. The test angle increment corresponds to the incremental angle by which the image will be rotated for each iteration of the projection and test process to determine the scene angle of the image. Thus, each successive iteration involves rotating the image to a new test angle which corresponds to the previous test angle increased by the test angle increment. Steps 710 through 720 of FIG. 7 illustrate this iterative projection and test process.

In step 710, a copy of the filtered image (typically, a digital image copy stored in a memory buffer) is rotated by the test angle. For the first iteration, the test angle typically corresponds to the test angle increment. For the second iteration, the test angle typically corresponds to two times the test angle increment, and so on. The rotated image is then projected against the y-axis, and a y differential sum is calculated, step 712. The rotated image is next projected against the x-axis, and an x differential sum is calculated, step 714. The x and y axes represent the pixel grid axes of the original image. The differential sum is simply the sum of differences of gray-scale pixel values between adjacent pixels which are coincident to the projected axes. Thus, a differential sum for a y-projection (diff sum y) sums the difference of gray-scale values of pixels for a particular row of pixels, and a differential sum for an x-projection (diff sum x) sums the difference of gray-scale values of pixels for a particular column of pixels. For example, if two pixels, each with a gray scale value of 10 are intersected by the projected x-axis, the x differential sum for the image at that particular test angle would be zero. In one embodiment of the present invention, the x differential sum is calculated using the following formula:

$$\text{diff sum } x = \sum_{x=2}^{n-1} |P_x(x-1) - P_x(x+1)|$$

Likewise, the y differential sum is calculated using the following formula:

$$\text{diff sum } y = \sum_{y=2}^{m-1} |P_y(y-1) - P_y(y+1)|$$

The limits of the summation for the x differential sum go from x=2 to n−1, and the limits of the summation for y differential sum go from y=2 to m−1. These limits prevent summation of values which are beyond the end of the image array.

Once the two computed sums are produced on the projection for a particular test angle, the sums for that test angle are assigned a score, which represents a relative value for that test angle. This is illustrated in step 716 of FIG. 7. In one embodiment of the present invention, the score calculated for the projections at a particular test angle is a normalized score which is calculated using the following formula:

$$score = \frac{diff\_sum\_x + diff\_sum\_y}{(m+n-2)}$$

Normalization of the score is provided by division of the sum of the differential sums by the number of elements in the projections, i.e., m+n-2. This produces a result that does not depend on the actual size of the image, but is instead determined only by the difference in pixel values for the projections.

After the score for projections at a particular test angle have been calculated, the score for projections at the next test angle is calculated. In step 718, the test angle is incremented by the test angle increment, and the filtered image is rotated by this new test angle. In one embodiment of the present invention, the original image is rotated by the new test angle. In an alternative embodiment of the present invention, the previously rotated image is rotated by the test angle increment. The approach of the first embodiment prevents accumulation of possible errors, such as round-off errors, from multiple successive rotations of the same image.

In step 720 it is determined whether the test angle is equal to or greater than a threshold angle. For a unidirectional image, that is, one in which the dominant features are only provided in one direction, the threshold angle is 180°. For a bidirectional image, one in which the dominant features are provided in two directions, such as along two orthogonal axes, the threshold angle is 90°. For a wafer which contain streets in both an x and y direction, such as may be used in an embodiment of the present invention, the threshold angle may be set to 90°. No calculation need be performed for images rotated beyond the threshold angle, since these calculations would be merely repeating calculations for test angles which equal the new test angle minus the threshold angle.

If, in step 720, it is determined that the new test angle is less than or equal to the threshold angle, the process repeats from step 710 in which the filtered image is rotated by the new test angle, and a score for that new test angle is computed using the differential sums for projections of the rotated image on the pixel axes, steps 712–716.

Once the normalized scores for projections for each of the test angles between 0° and the threshold angle have been determined, a graph of the scores is generated. In one embodiment of the present invention, the scores are presented on a graph which plots the magnitude of the score versus the test angle. From this score-angle plot, the peak score is determined, as illustrated in step 722 of FIG. 7. The angle corresponding to the peak score represents the scene angle of the image.

Figure 6A:
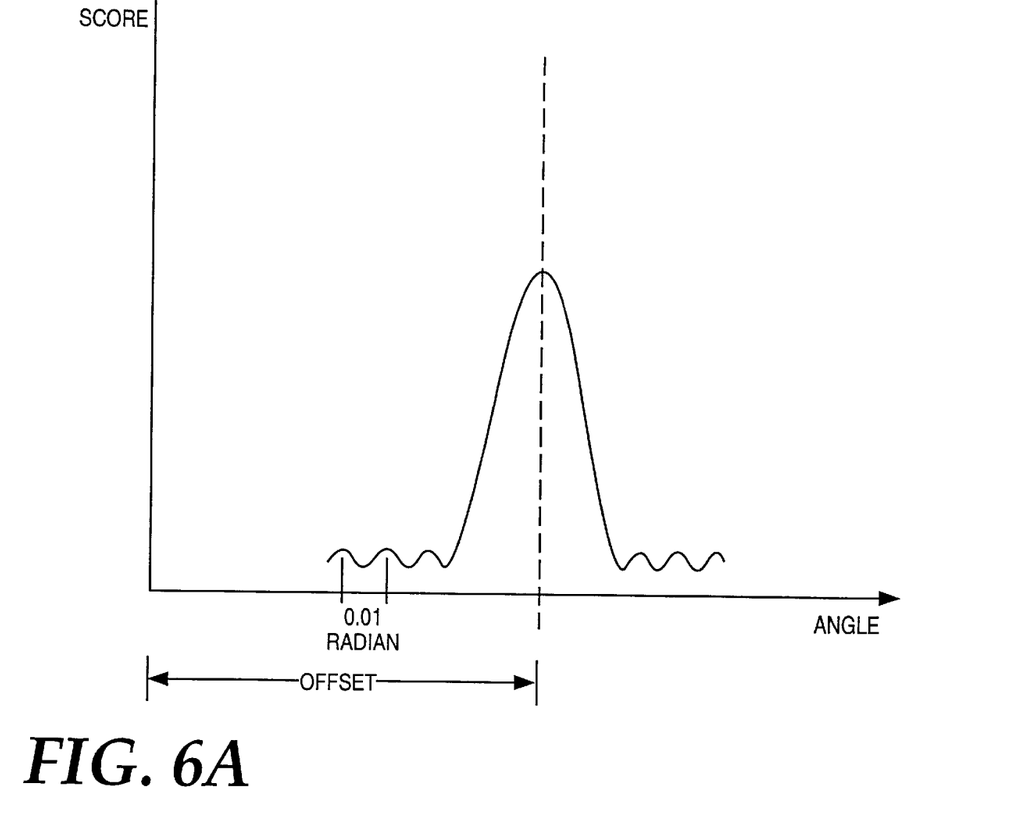
FIG. 6A illustrates a typical score-angle plot which may be generated by an embodiment of the present invention.

FIG. 6A illustrates a typical plot of scores versus test angles that may be generated for an image processed by an embodiment of the present invention. Each peak on the plot represents the score for a particular test angle. For a typical plot, one score, or a group of scores should have a significantly higher magnitude then the rest of the scores. Depending on the angular resolution (i.e., the incremental difference among the test angles) and the resolution of the filtered image, the peak of the score-angle plot may be defined by a number of points. In this case, the parabola defining the peak on the score-angle plot may be interpolated to determine the exact angle corresponding to the peak score.

Figure 6B:
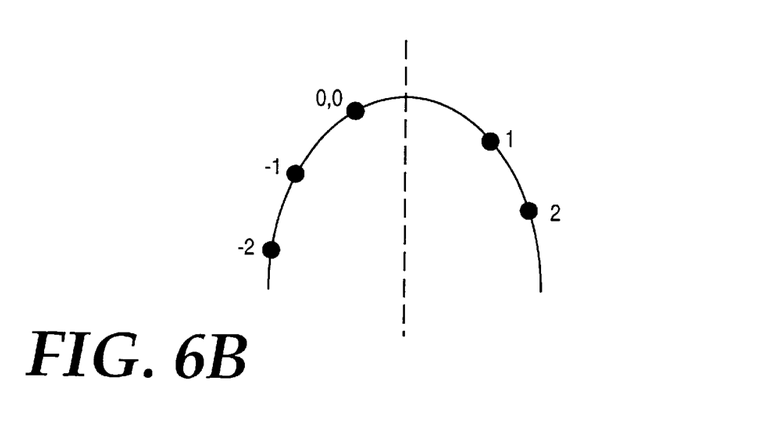
FIG. 6B illustrates the interpolation of points around the peak of the score-angle plot of FIG. 6A.

In one embodiment of the present invention, interpolation of the curve around the peak is performed using a five-point least square error fit to a quadratic. This technique returns the angle corresponding to the actual peak score for the score-angle plot. FIG. 6B illustrates a case where the peak score is defined by a parabola defined by five points. The peak point of the parabola is determined using a five-point least square error fit technique. This technique is particularly effective in cases where the actual peak point is not defined by an actual score, as is the case in the plot illustrated in FIG. 6B. To determine the peak score, the highest score (which may or may not be the peak) is set to zero, to denote an origin or reference point. Thus, in FIG. 6B, the highest point is denoted 0,0. The two points immediately to right of the zero point are assigned values+1 and +2, and the two points immediately to left of the zero point are assigned values–1 and –2.

Using the five points that define the peak of the parabola, three sums are calculated using the following formulae:

$$sum = \sum_{i=-2}^{2} score(i)$$

$$sum\_f = \sum_{i=-2}^{2} score(i) * i$$

$$sum\_f^2 = \sum_{i=-2}^{2} score(i) * i * i$$

These three sums are calculated using the scores for the five points–2,–1, 0, 1, and 2.

The three sum values sum, sum__, and sum__$f^2$ are used to compute two intermediate values P1 and P2. The first intermediate value is calculated using the following formula:

P1=sum__f /10.0

The second intermediate value is calculated using the following formula:

P2=(sum__$f^2$ /14.0)–(sum/7.0)

The values of the divisors for the three sums, i.e., 10, 14, and 7, are derived by solving the quadratic equation y=ax$^2$+bX+C for unknowns a, b, and c, for points located at x={-2,-1, 0,+1,+2}.

The intermediate values P1 and P2 are used to calculate a preliminary angle A, which is calculated by the following formula:

$$A = -0.5 * \frac{P1}{P2}$$

In one embodiment of the present invention, the intermediate value P2 is first checked to determine whether it is close to zero. An intermediate P2 value close to zero implies that the points of the parabola represent noise and not angle information relating to meaningful edge information. In this case, the preliminary angle is assigned a value of zero.

The actual scene angle of the object in relation to the x and y pixel coordinates is calculated from the preliminary angle using the following formula:

scene angle=test angle increment * A+offset

In the above equation, the preliminary angle, A, is multiplied by the test angle increment, which is simply the incremental angle by which each iteration of the projected image was rotated. If, as in the above discussion, the incremental angle is 0.01 radians, the scene angle formula would be scene angle=0.01 * A+offset The offset value is the angle of the peak from the origin, as illustrated in FIG. 6A. This value must be added back in since the peak score for the parabola was assigned a nominal value of zero. It should be noted that the units of the test angle increment, the preliminary angle and the offset must be consistently maintained (e.g., either radians or degrees).

Although, the above embodiment has been described with regard to interpolation using a five-point least square error fit to a quadratic, it should be noted that other interpolation techniques may also be used. For example, alternative embodiments may employ a interpolation techniques such as Taylor series, power series, a linear zero-crossing fit to a first derivative, or other similar techniques.

In one embodiment of the present invention, the scene angle provided by the above interpolation method is used to provide a coarse alignment or angle correction to an image processing system for the alignment of a silicon wafer on a wafer chuck for the purposes of test probe alignment.

The steps of a method of the present invention may be implemented by a central processing unit (CPU) in a computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention. The instructions may be loaded into the memory of the computer from a storage device or from one or more other computer systems over a network connection. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU. In other embodiments, hardwired circuitry may be used in place of, or in combination with, software instructions to implement the present invention. Thus, the present invention is not limited to any specific combination of hardware circuitry and software, nor to any particular source for the instructions executed by the computer.

In the foregoing, a system has been described for determining the rotational orientation of an object. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising:

capturing an image of an object in an image processing system;

performing a filtering operation on said image to produce a filtered image containing enhanced edge information for said image;

rotating the filtered image by an incremental angle to produce a rotated image;

projecting the rotated image onto an x-axis and y-axis defined relative to said image to form projected pixels image from an intersection of said x-axis and said y-axis with said rotated image;

computing a score for a projection of the rotated image, said score corresponding to a sum of differences of pixel values for said projected pixels;

performing said rotating, said projecting and said computing for subsequent rotated images, each rotated image of said subsequent rotated images being rotated by a multiple of said incremental angle; and determining a peak score from said score for the rotated image projection and subsequent scores for the subsequent rotated image projections.

2. The method of claim 1 further comprising deriving an angle corresponding to a rotational orientation of said object from said peak score.

3. The method of claim 2 further comprising scaling said image prior to said performing said filtering operation, said scaling said image comprising selecting a subset of pixels within said image to form a scaled image.

4. The method of claim 2 wherein said multiple is an integer multiple, and said rotating, said projecting and said computing for subsequent rotated images comprises increasing said multiple for each iteration until a product of said multiple and said incremental angle exceeds a threshold angle.

5. The method of claim 4 wherein each pixel of the projected pixels is assigned a gray-scale value, and said score corresponds to the sum of differences between gray-scale values for each adjacent pair of projected pixels.

6. The method of claim 5 wherein said determining said peak score comprises:

determining a highest score of said score and said subsequent scores;

defining a curve from a plot of score versus angle for each image of the rotated image and said subsequent rotated images, said curve including said highest score and scores neighboring said highest score; and interpolating said curve to determine a peak point of said curve, said peak point corresponding to said peak score.

7. The method of claim 6 wherein said curve includes at least four points neighboring said highest score, and said peak is interpolated by a five-point least square error fit to a quadratic.

8. The method of claim 4 wherein said performing a filtering operation on said image is performed using a Sobel filter.

9. The method of claim 6 wherein said image processing system is used in a silicon wafer probe system comprising a test probe fixture, and said object is a silicon wafer.

10. The method of claim 9 wherein said angle is input to a control unit of said image processing system, and is used by said control unit to rotate said wafer relative to said test probe fixture.

11. An image processing system comprising:

a processor;

a memory coupled with said processor, said memory having contained therein sequences of instructions which, when executed by said processor cause said processor to perform:

performing a filtering operation on an image of an object to produce a filtered image containing enhanced edge information for said image;

rotating the filtered image by an incremental angle to produce a rotated image;

projecting the rotated image onto an x-axis and y-axis defined relative to said image to form projected pixels image from an intersection of said x-axis and said y-axis with said rotated image;

computing a score for a projection of the rotated image, said score corresponding to a sum of differences of pixel values for said projected pixels;

performing said rotating, said projecting and said computing for subsequent rotated images, each rotated image of said subsequent rotated images being rotated by a multiple of said incremental angle;

determining a peak score from said score for the rotated image projection and subsequent scores for the subsequent rotated image projections; and deriving an angle corresponding to a rotational orientation of said object from said peak score.

12. The image processing system of claim 11 further comprising a silicon wafer prober, said silicon wafer prober comprising a test probe fixture, and wherein said object is a silicon wafer.

13. The image processing system of claim 12 wherein said angle is input to a control unit of said image processing system, and is used by said control unit to rotate said silicon wafer relative to said test probe fixture.

14. The image processing system of claim 13 wherein said performing a filtering operation is performed by said processor through a Sobel filtering technique, and said determining said peak score is performed by said processor through in interpolation technique performed on a curve defined by a highest score of said score and said subsequent scores.

15. A medium having stored thereon sequences of instructions which are executable by a digital processing system, and which, when executed by said digital processing system, cause said digital processing system to perform:

capturing an image of an object in an image processing system;

performing a filtering operation on said image to produce a filtered image containing enhanced edge information for said image;

rotating the filtered image by an incremental angle through a range of angles to produce a series of rotated images;

projecting each image of said series of rotated images onto an x-axis and y-axis defined relative to said image to form a group of projected pixels from an intersection of said x-axis and said y-axis with said each image;

computing a score for each projection of said each image of said series of rotated images, said score corresponding to a sum of differences of pixel values for said group of projected pixels;

determining a highest score from said score for each projection; and deriving an angle corresponding to a rotational orientation of said object from said highest score.

16. The medium of claim 15 further comprising instructions which, when executed by said digital processing system, cause said digital processing system to perform scaling said image prior to said performing said filtering operation, said scaling said image comprising selecting a subset of pixels within said image to form a scaled image.

* * * * *